US012763650B2

(12) United States Patent
Arnault et al.

(10) Patent No.: US 12,763,650 B2
(45) Date of Patent: Oct. 13, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 149 days.

(21) Appl. No.: 18/589,874

(22) Filed: Feb. 28, 2024

(65) Prior Publication Data

US 2024/0305174 A1 Sep. 12, 2024

(30) Foreign Application Priority Data

Mar. 8, 2023 (FR) ....................................... 2302142

(51) Int. Cl.
*H02K 11/40* (2016.01)
*H01R 39/39* (2006.01)

(52) U.S. Cl.
CPC ............. *H02K 11/40* (2016.01); *H01R 39/39* (2013.01)

(58) Field of Classification Search
CPC ...... H02K 13/00; H02K 13/003; H02K 11/40; H02K 5/14; H02K 5/141; H02K 5/143; H02K 5/144; H02K 5/146; H02K 5/148
See application file for complete search history.

(56) References Cited

U.S. PATENT DOCUMENTS 11,454,285 B2 * 9/2022 Arnault ................. F16C 35/077
11,486,445 B2 * 11/2022 Berruet ................. F16C 41/002
2020/0295634 A1 * 9/2020 Lenz .................... H01R 39/025
2021/0021180 A1 * 1/2021 Hubert .................. F16C 41/002
2021/0310517 A1 * 10/2021 Berruet .................. H01R 39/39
2021/0364041 A1 * 11/2021 Berruet .................... F16C 19/52
2022/0294319 A1 * 9/2022 Arnault ................ H02K 13/003

FOREIGN PATENT DOCUMENTS

JP 2015095440 A 5/2015

OTHER PUBLICATIONS

Preliminary Search Report from the French Patent Office dated Oct. 13, 2023 in related French application No. FR 2302142, including Search Report and Written Opinion.
Unpublished U.S. Appl. No. 18/589,984, first named inventor: Benoit Arnault, filed Feb. 28, 2024.

* cited by examiner

*Primary Examiner* — Oluseye Iwarere
*Assistant Examiner* — Nicholas Lee Setzer
(74) *Attorney, Agent, or Firm* — J-TEK LAW PLLC; Scott T. Wakeman; Mark A. Ussai

(57) ABSTRACT

A grounding brush assembly includes a grounding brush provided with a plurality of conductive fibers and a support inside of which the conductive fibers are fitted. A brush fitting plate is connected with the support of the brush, the fitting plate including a radial portion supported axially against the support of the brush and a plurality of retention tongues for axial retention of the support. The fitting plate also includes a plurality of axial centering portions each extending from the radial portion and spaced circumferentially apart. The centering portions are supported radially against the support of the brush, each retention tongue being located circumferentially between two successive axial centering portions.

7 Claims, 15 Drawing Sheets

GROUNDING BRUSH ASSEMBLY

BACKGROUND OF THE INVENTION

This application claims priority to French patent application no. 2302142 filed on Mar. 8, 2023, the contents of which are fully incorporated herein by reference.

BACKGROUND OF THE INVENTION

The present invention relates to grounding devices, and more particularly to grounding devices for controlling the shaft current generated in motors or electrical machines having bearings.

In a motor or electrical machine, at least one roller bearing is fitted between the housing of the motor or electrical machine and a rotary shaft, in order to support the shaft. During operation when the shaft is rotating, a difference of electrical potential may arise between the shaft and the housing of the motor or the electrical machine, which may generate an electric current between the inner ring of the roller bearing, which is disposed on the shaft, and the outer ring which is connected with the housing.

The electric current which passes through the components of the roller bearing can damage these components, in particular the rolling elements and the raceways provided on the inner and outer rings. These electrical discharges can also generate vibrations.

In order to eliminate such electrical discharges, it is known to earth or ground the rotary shaft by using a brush or a grounding brush comprising conductive fibers. The grounding brush is generally fitted in the bore of the housing of the electric motor, such that the free ends of the fibers are in radial contact with the outer surface of the rotary shaft.

Due to the conductivity of the fibers, the brush is kept at the same electrical potential as the housing of the electric motor. The inner and outer rings of the roller bearing are also at the same electrical potential, which reduces or even eliminates the problematic electrical discharges through the roller bearing.

A grounding brush assembly as disclosed in US Patent Publication No. 2021/0021180A1 includes a grounding brush provided with a plurality of conductive fibers, a support inside which the conductive fibers are fitted, and an annular fitting plate comprising a plurality of tongues for radial and axial retention of the support. The tongues are formed by cutting and plastic deformations of a radial portion of the fitting plate, which is supported axially on the support.

In order to form the retention tongues, it is necessary to make cuts or openings of a relatively substantial size in the radial portion of the fitting plate. These cuts/openings decrease the mechanical resistance of the fitting plate to the forces exerted during fitting of the plate within the bore of the housing of the associated electric motor.

In addition, due to the folded length of the retention tongues, stress concentration occurs during the folding of the tongues on the support of the brush. Also, the radial centering of the support is provided by the retention tongues, which may result in angular misalignment between the support and the fitting plate.

SUMMARY OF THE INVENTION

An object of the present invention is to eliminate the disadvantages discussed above.

The present invention concerns a grounding brush assembly comprising a grounding brush provided with a plurality of conductive fibers, and a support inside which the conductive fibers are fitted. The assembly also comprises a brush fitting plate which is integral with the support of the brush, the fitting plate comprising a radial portion which is supported axially against the support of the brush, and tongues for axial retention of the support.

According to a general characteristic of the present invention, the fitting plate includes a plurality of axial portions for radial centering of the support of the brush, which extend from the radial portion, while being spaced from one another in the circumferential direction, and are supported radially against the support of the brush. Each retention tongue is situated circumferentially between two successive axial centering portions.

With this type of a fitting plate, the retention tongues are obtained from an annular axial portion of the fitting plate, which is supported radially against the support, the axial centering portions being formed from this annular portion during the cutting of openings making it possible to obtain the tongues. With this design, the folded length of the retention tongues is reduced, which limits the phenomena of concentration of stresses on the fitting plate. In addition, the dimension of the cuts made in the fitting plate for the formation of the tongues is also reduced.

Furthermore, the radial centering of the support is assured by the axial portions of the fitting plate, which improves the precision of the angular alignment between the support and the fitting plate.

Preferably, the support of the brush comprises a fitting portion and two lateral flanks which extend the fitting portion and enclose the conductive fibers axially.

In this case, the radial portion of the fitting plate can be supported axially against one of the lateral flanks of the support, and the axial centering portions are supported radially against the fitting portion of the support.

According to one embodiment, each tongue for retention of the fitting plate comprises an axial portion which is supported radially against the fitting portion of the support of the brush, and a portion which is folded back towards the interior, and is axially in contact against the support, for example against the other lateral flank of the support.

The folded-back portion of each tongue for retention of the fitting plate is situated axially on the side opposite the radial portion of the fitting plate, relative to the support of the brush.

Preferably, the fitting plate additionally comprises a fitting portion which is offset radially towards the exterior relative to the axial centering portions and to the retention tongues, and is provided with an outer surface defining the outer diameter of the fitting plate.

According to a particular design, the fitting portion of the fitting plate comprises an annular flange.

The annular flange can be supported radially against the axial centering portions and the tongues for retention of the fitting plate by forming a fold, and in order to obtain locally a double thickness of material. The radial size of the assembly is reduced.

Alternatively, the annular flange can remain radially spaced from the axial centering portions and the tongues for retention of the fitting plate.

According to another design, the fitting portion of the fitting plate comprises a plurality of fitting lugs which are spaced from one another in the circumferential direction.

The fitting plate can also comprise at least one connection portion extending from at least one of the axial centering portions, and connected to the fitting portion. The connection portion and the radial portion of the fitting plate are situated axially on both sides of the support of the brush.

The invention also concerns an electric motor comprising a housing, a shaft, and at least one grounding brush assembly as previously defined, and fitted radially between the housing and the shaft, the conductive fibers of the brush of the assembly being in contact with the shaft.

BRIEF DESCRIPTION OF THE SEVERAL VIEWS OF THE DRAWINGS

The present invention will be better understood by studying the detailed description of embodiments, taken by way of non-limiting examples, and illustrated by the appended drawings in which.

DETAILED DESCRIPTION OF THE INVENTION

Figure 1:
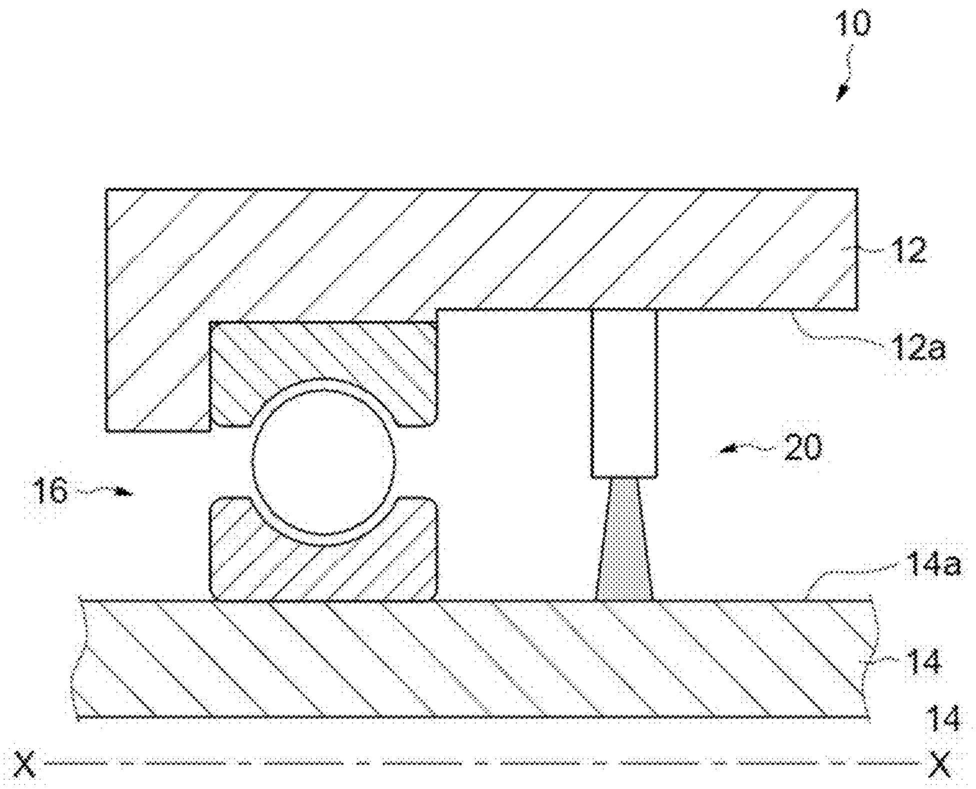
FIG. 1 is a view in axial cross-section of a grounding brush assembly fitted radially between a rotary shaft and an electric motor housing.

FIG. 1 represents in axial cross-section a part of a motor 10 or an electrical machine comprising a fixed housing 12, and a rotary shaft 14, which is rotatable about an axis X-X, the shaft 14 being supported radially by a roller bearing 16. In the present exemplary embodiment, the bearing 16 is a ball bearing, but may be provided with any other appropriate type of rolling elements, such as cylindrical rollers, tapered rollers, needles, etc., and may even be formed as a plain bearing.

The motor 10 also comprises a grounding brush assembly 20 which is fitted radially between the bore 12*a* of the housing 12 and the cylindrical outer surface 14*a* of the rotary shaft 14. The grounding brush assembly 20 enables a continuous dissipation any electrical charges accumulating on the shaft 14 of the motor 10 during the motor operation, specifically by transferring such electrical charges to the housing 12.

Figure 2:
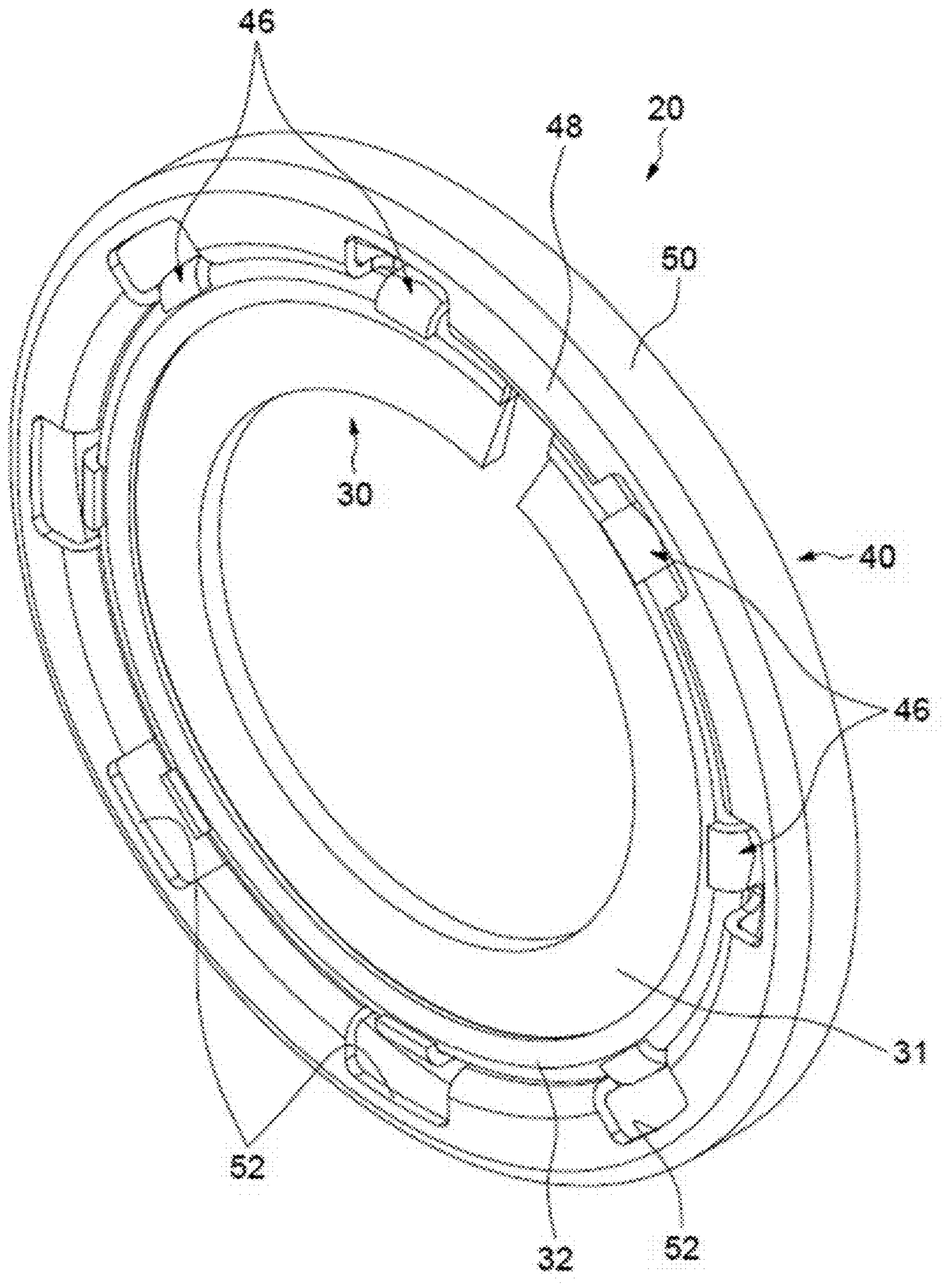
FIG. 2 is a view in front perspective of a grounding brush assembly according to a first embodiment of the invention.
Figure 3:
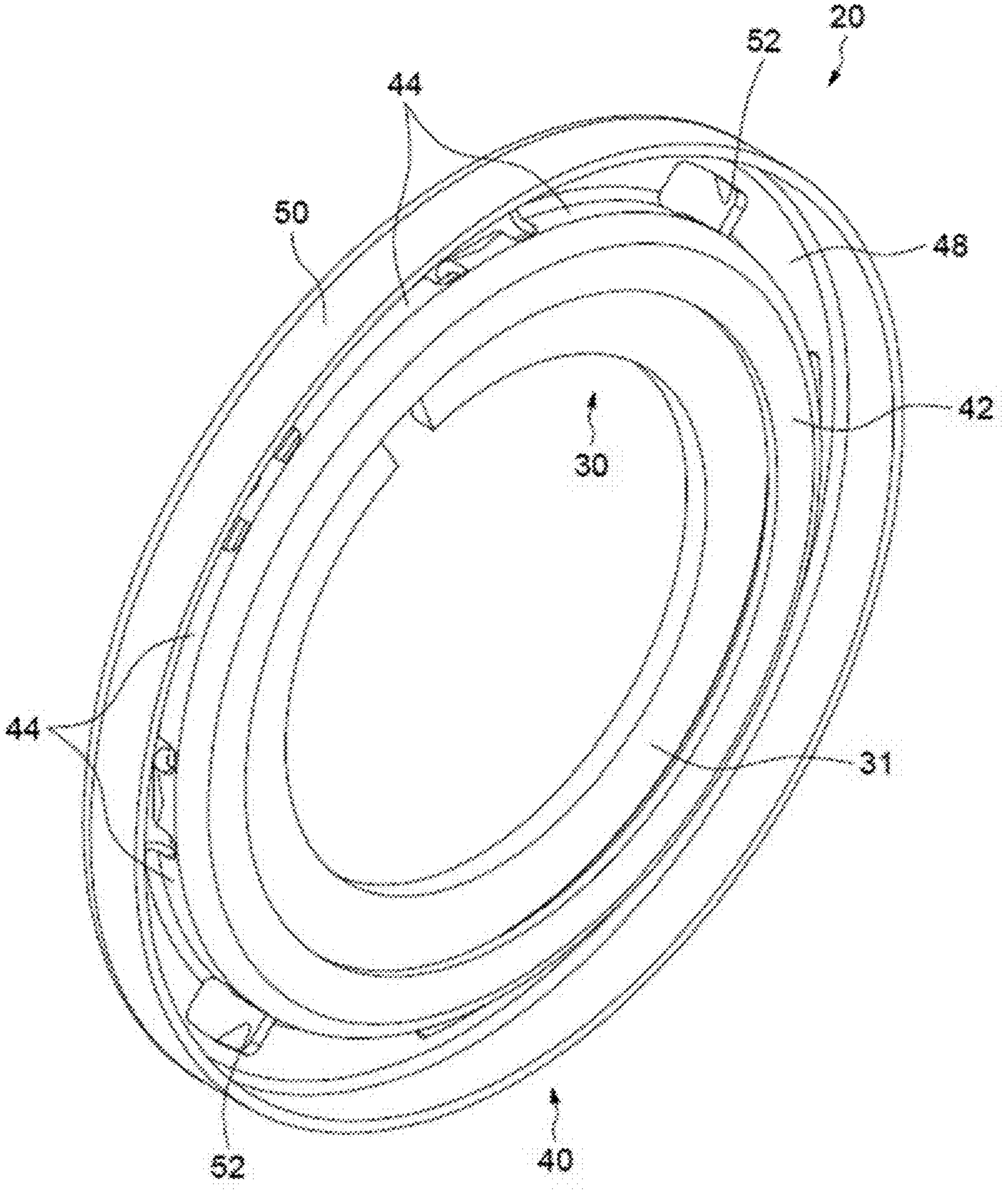
FIG. 3 is a view in rear perspective of a grounding brush assembly according to the first embodiment of the invention.
Figure 4:
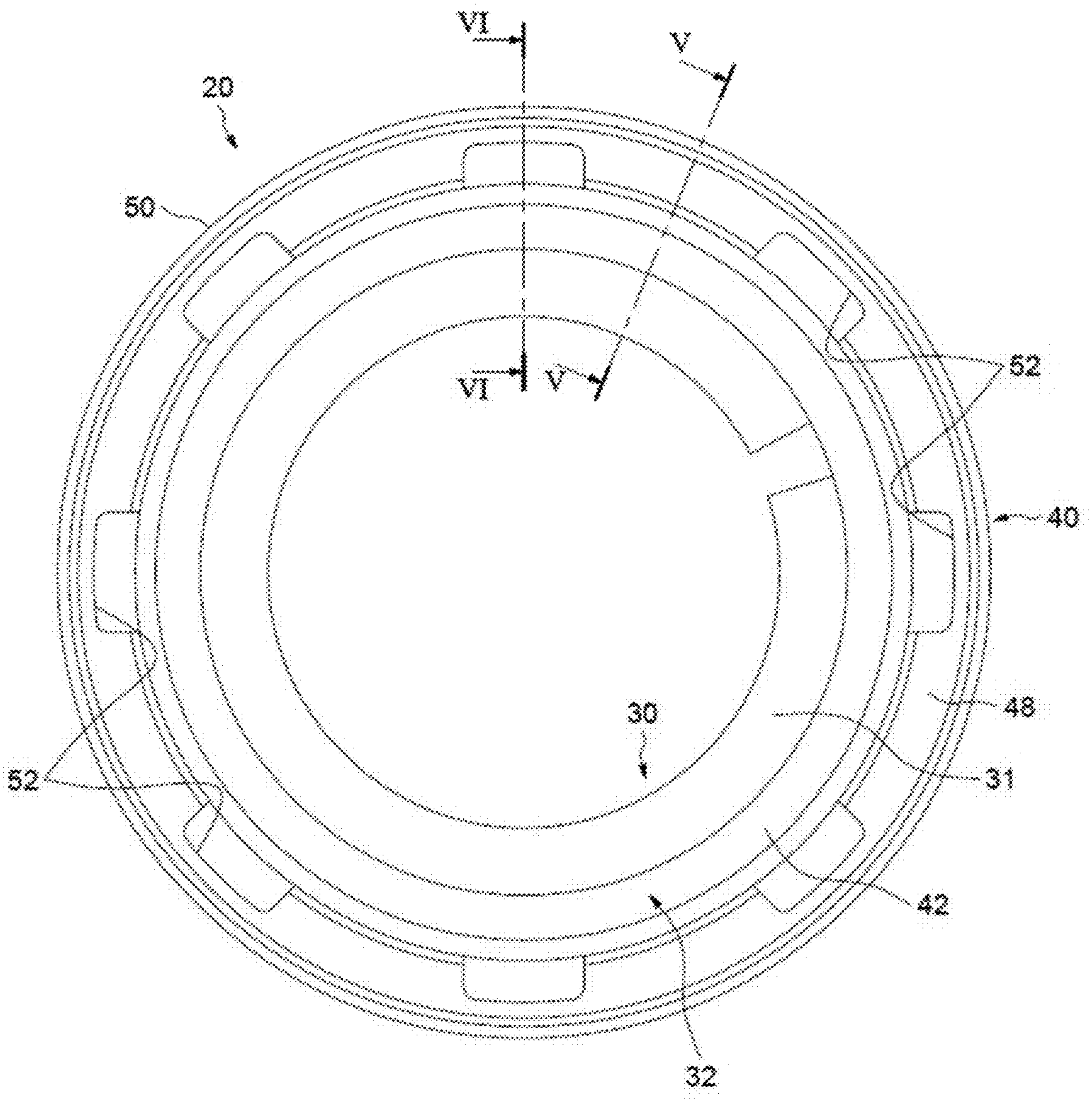
FIG. 4 is a front view of the grounding brush assembly of FIGS. 2 and 3.

With reference to FIGS. 2-4, a description will now be provided of a grounding brush assembly 20 according to a first embodiment of the invention. The grounding brush assembly 20 has a generally annular form and basically comprises a grounding brush 30 and a brush fitting plate 40 configured to retain the brush 30 axially and radially.

The brush 30 includes a plurality of individual conductive fibers 31, which are designed to be placed around the rotary shaft of the motor 10. The conductive fibers 31 can be made of carbon, stainless steel, or conductive plastics, such as acrylic or nylon fibers.

The brush 30 also includes a unit 32 for retention, or a "support" 32, inside of which the conductive fibers 31 are fitted. In the depicted embodiment, the support 32 is formed as an open ring and may be made by cutting and stamping. Further, the support 32 is made of electrically conductive material, such as, for example, aluminum, stainless steel, bronze, copper or another material. Alternatively, the support 32 may be made of non-electrically conductive material with a conductive coating or conductive paint.

Figure 5:
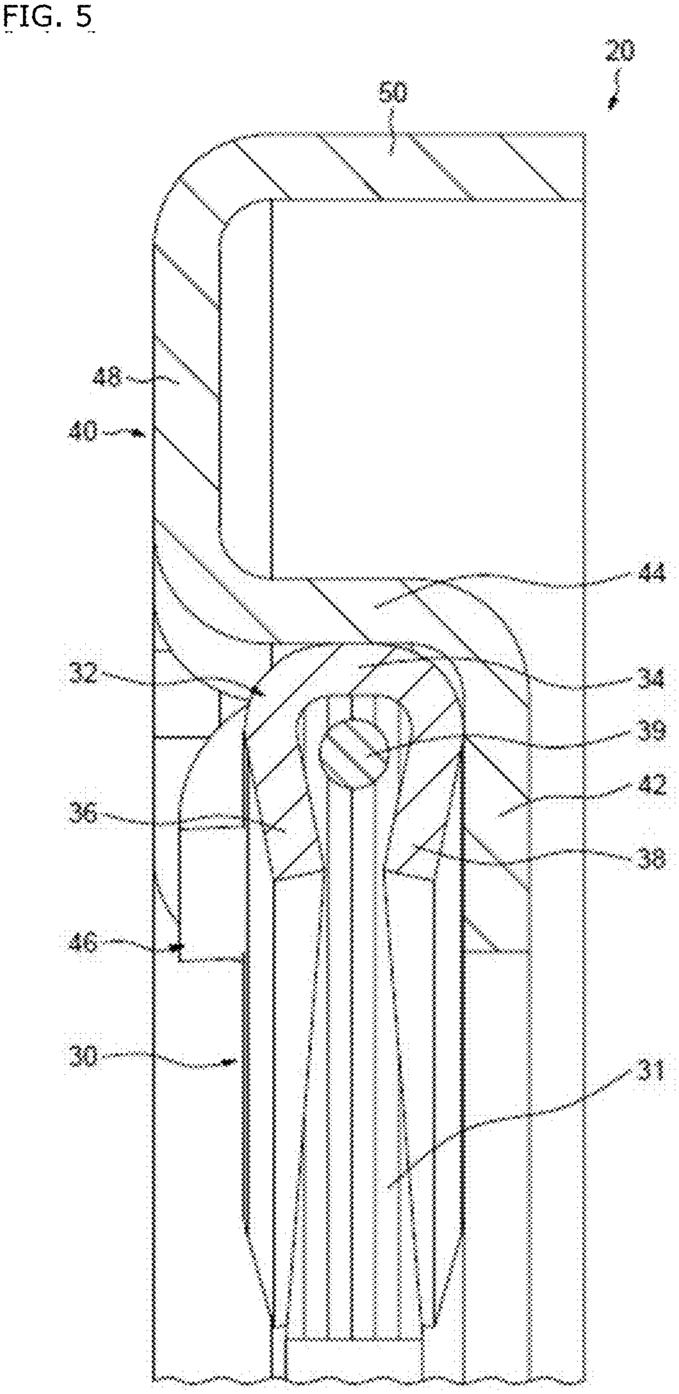
FIG. 5 is a view in cross-section along the axis V-V of FIG. 4.
Figure 6:
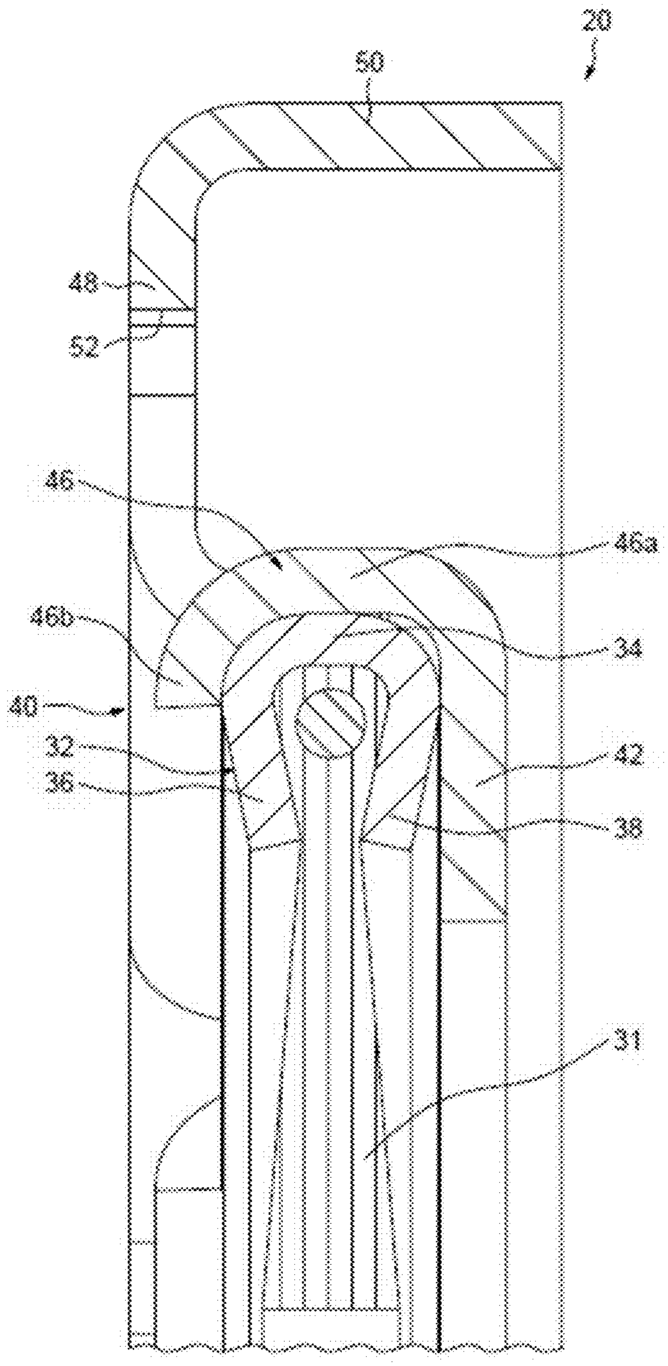
FIG. 6 is a view in cross-section along the axis VI-VI of FIG. 4.

As best shown in FIGS. 5 and 6, the support 32 includes an axial fitting portion 34 and two opposing lateral flanks 36, 38 extending radially inwardly from the fitting portion 34 and axially enclosing the conductive fibers 31. As such, the conductive fibers 31 are supported axially on both sides against the lateral flanks 36, 38.

The fitting portion 34 and the two lateral flanks 36, 38 delimit a channel which is open radially on the inner side, and inside which the conductive fibers 31 are partly situated or disposed.

In the illustrated example, the conductive fibers 31 are folded around a connection wire 39 of the support 32. The distal free end or ends of each conductive fiber 31 is designed to come into radial contact with the outer surface of the rotary shaft 14 of the motor 10. The proximal end of the conductive fibers 31 is in radial contact with the fitting portion 34 of the support 32.

The lateral flank 36 extends radially inwardly from one axial end of the fitting portion 34 and the lateral flank 38 extends radially inwardly from the opposite axial end thereof. Preferably, the lateral flanks 36, 38 extend obliquely towards the interior from the fitting portion 34. The lateral flanks 36, 38 are symmetrical with one another relative to a median radial plane of the support 32. Preferably, the fitting portion 34 extends substantially or entirely axially. Alternatively, the fitting portion 34 may extend obliquely and/or the lateral flanks 36, 38 are asymmetrical.

Further, the brush 30 is in the form of an open ring comprising a first end which is spaced circumferentially from a second end circumferentially facing the first end, as shown in FIGS. 2 to 4. Such circumferential spacing between the two ends of the brush 30 allows the brush 30 to adapt to different diameters of the shaft 14 of the motor 10.

In general, the first end of the brush 30 and the second end are not secured to one another, but can be in contact with each other. As a variant, it is possible to secure the first end and the second end of the brush 30 to one another.

As illustrated in FIGS. 3 and 5, the fitting plate 40 of the brush comprises an annular radial portion 42 and a plurality of axial portions 44 which extend from the radial portion 42 and are spaced circumferentially apart. The axial portions 44 extend from an outer surface of the radial portion 42. Preferably, the axial portions 44 are regularly or evenly spaced from one another in the circumferential direction, but may alternatively be spaced irregularly or staggered circumferentially.

The radial portion 42 of the fitting plate 40 is supported axially against the support 32 of the brush 30. More specifically, the radial portion 42 is supported axially against the lateral flank 38 of the support 32. Each axial portion 44 radially surrounds the support 32 locally and is in radial contact with the support 32. More specifically, each axial portion 44 locally radially surrounds the fitting portion 34 of the support 23 and is in radial contact with the fitting portion 34. The axial portions 44 are configured to center the support 32 and also radially retain the support 32.

As illustrated in particular in FIGS. 2 and 6, the fitting plate 40 of the brush 30 also includes a plurality of retention tongues 46 for axial retention of the brush 30, which in this case extend from the radial portion 42. Each tongue 46 is situated or disposed circumferentially between two immediately successive axial portions 44.

As described in greater detail below, the fitting plate 40 also includes an annular radial portion 48 extending radially outwardly from the axial portions 44 and an annular flange 50 which extends axially from the radial portion 48. The radial portion 48 forms a portion for connection of the axial portions 44 to the flange 50, i.e., a "connection portion".

Each tongue 46 extends from the outer surface of the radial portion 42. Each tongue 46 extends projecting axially relative to the radial portion 42.

Each tongue 46 locally radially surrounds the support 32 and is in radial contact with the fitting portion 34 of the support 32. The support 32 is retained and supported axially against the radial portion 42 of the fitting plate 40 by the tongues 46. In other words, the tongues 46 make it possible to retain the support 32 axially.

Each tongue 46 includes an axial portion 46*a* which extends axially from the radial portion 42 and a "folded-back" or radial portion 46*b* which is folded back radially towards the interior, i.e., extends radially inwardly from the axial portion 46*a*, and is provided at the free end of the axial portion 46*a*. The axial portion 46*a* of each tongue 46 is generally formed as a portion of a cylinder. Alternatively, the axial portion 46*a* of each tongue 46 may be formed generally flat (e.g., a flat plate portion). Each axial portion 46*a* locally radially surrounds the support 32 and contacts the support 32. More specifically, each axial portion 46*a* locally radially surrounds the fitting portion 34 of the support 32 and is in radial contact with the fitting portion 34.

The folded-back or radial portion 46*b* of each tongue 46 enables axial retention of the support 32 of the grounding brush 30. The radial/folded-back portion 46*b* of each tongue 46 is in axial contact against the lateral flank 36 of the support 32. Preferably, the tongues 46 are all identical to each other.

The tongues 46 of the fitting plate 40 are spaced apart from one another in the circumferential direction, in this case regularly or evenly. Alternatively, the tongues 46 may be circumferentially spaced irregularly or staggered. In the illustrated embodiment, there are eight tongues 46. Alternatively, it is possible to provide a greater or lesser number of tongues 46. For example, the fitting plate 40 may include only two tongues 46 or at least four tongues 46, but preferably includes at least two tongues 46.

As previously indicated, the fitting plate 40 includes the radial portion 48, which extends radially outwardly from the axial portions 44. The radial portion 48 extends from the axial portions 44 on the axial side opposite to the radial portion 42. As such, the radial portion 48 is offset axially relative to the radial portion 42 such that the two radial portions 42 and 48 are situated or located axially on both sides of the support 32. More specifically, the radial portion 42 is supported axially against the lateral flank 38 of the support 32, and the radial portion 48 is offset axially relative to the lateral flank 36 of the support 32 on the side opposite to the radial portion 42.

Figure 7:
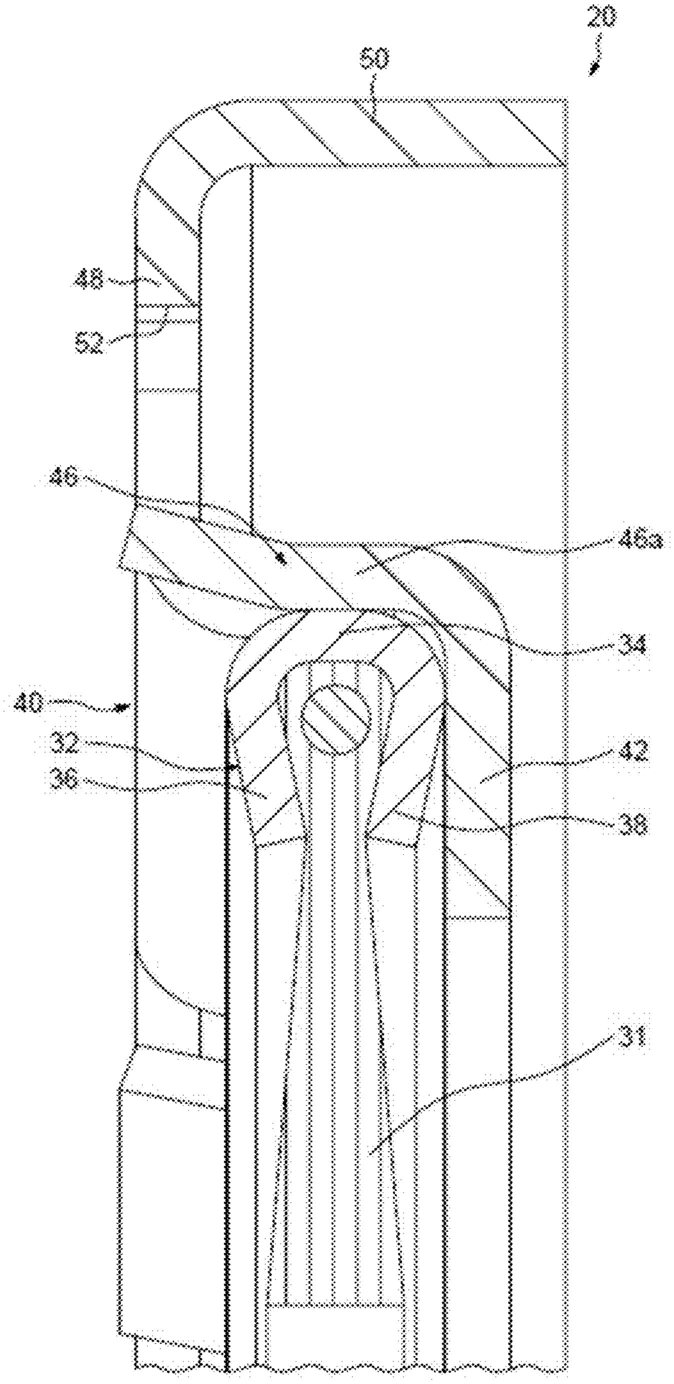
FIG. 7 is a view in cross-section along the axis VI-VI of FIG. 4 before a crimping operation.

A plurality of through-openings 52 are provided in the thickness of the radial portion 48 of the fitting plate 40. As shown in FIGS. 2 and 3, the openings 52 also extend axially on the fitting plate 40, and each opening 52 circumferentially separates two immediately successive axial portions 44 of the fitting plate 40. Preferably, the openings 52 are formed during the partial cutting of the fitting plate 40 when forming the tongues 46. That is, the tongues 46 are formed by cutting, folding and crimping of the fitting plate 40. FIG. 7 depicts the process of forming the tongues 46 immediately prior to a step of crimping the tongues 46 against the lateral flank 36 of the support 32. The axial portions 44 are also formed during the step of cutting of the fitting plate 40 from an axial portion which has an initial annular form.

The annular flange 50 of the fitting plate 40 extends axially from a large diameter edge of the radial portion 48. In the depicted embodiment, the flange 50 extends axially on the same side as the axial portions 44 and the tongues 46. Alternatively, the flange 50 could extend axially on the opposite side.

The flange 50 locally radially surrounds the axial portions 44 and the tongues 46 while remaining radially spaced therefrom. In other words, the bore of the flange 50 is spaced radially from the axial portions 44 and the tongues 46 by a non-zero radial distance. The outer surface of the flange 50, which is radially opposite of the bore of the flange 50, defines the outer diameter of the fitting plate 40. The flange 50 provides a portion for fitting and centering of the fitting plate 40 during the fitting within in the bore 12*a* of the housing 12 of the associated electric motor 10.

Preferably, the fitting plate 40 is made by cutting and stamping. The fitting plate 40 is formed of a conductive material, such as for example, aluminum, stainless steel, bronze, copper or another appropriate material. Alternatively, the fitting plate 40 may be formed of an electrically non-conductive material that is provided with a conductive coating or a conductive paint.

Figure 8:
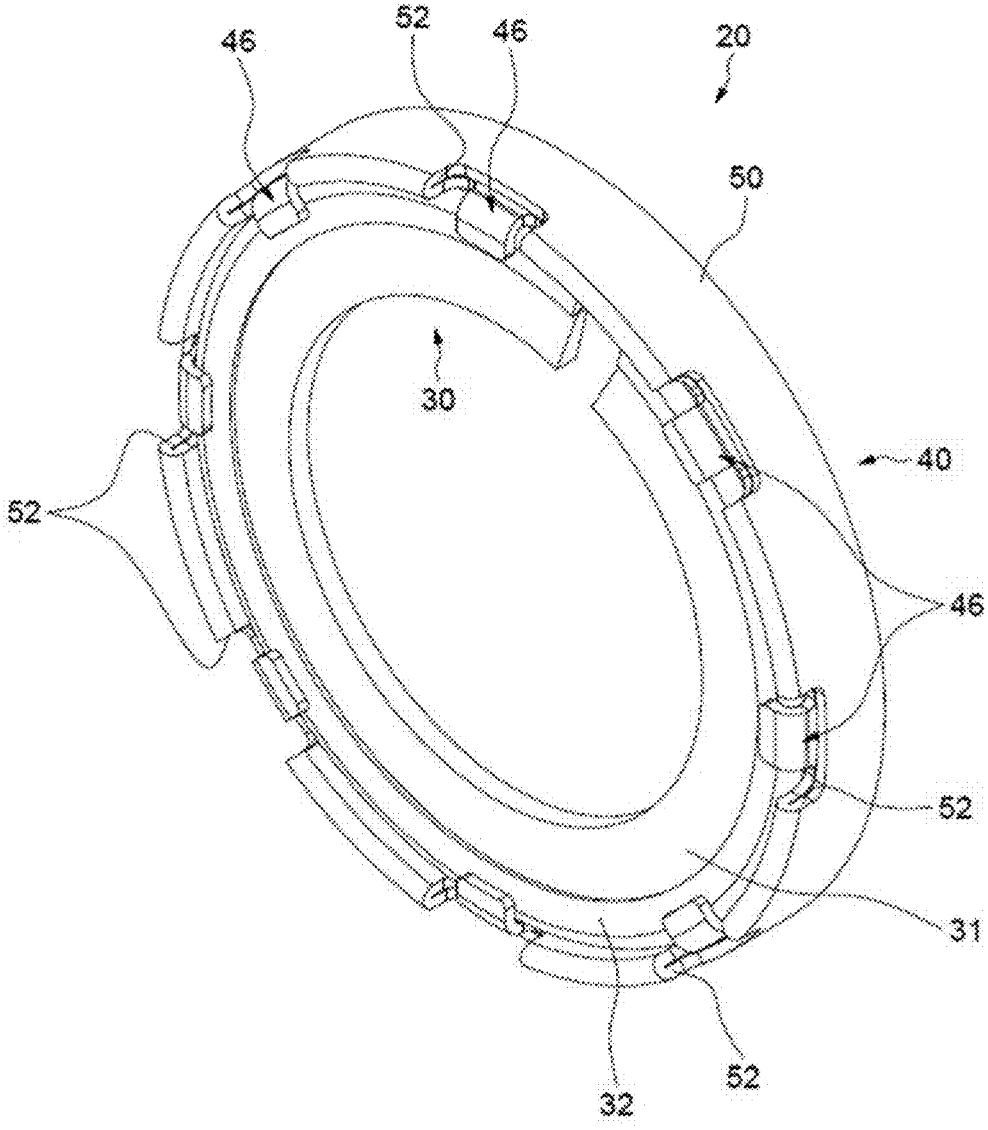
FIG. 8 is a view in perspective of a grounding brush assembly according to a second embodiment of the invention.
Figure 9:
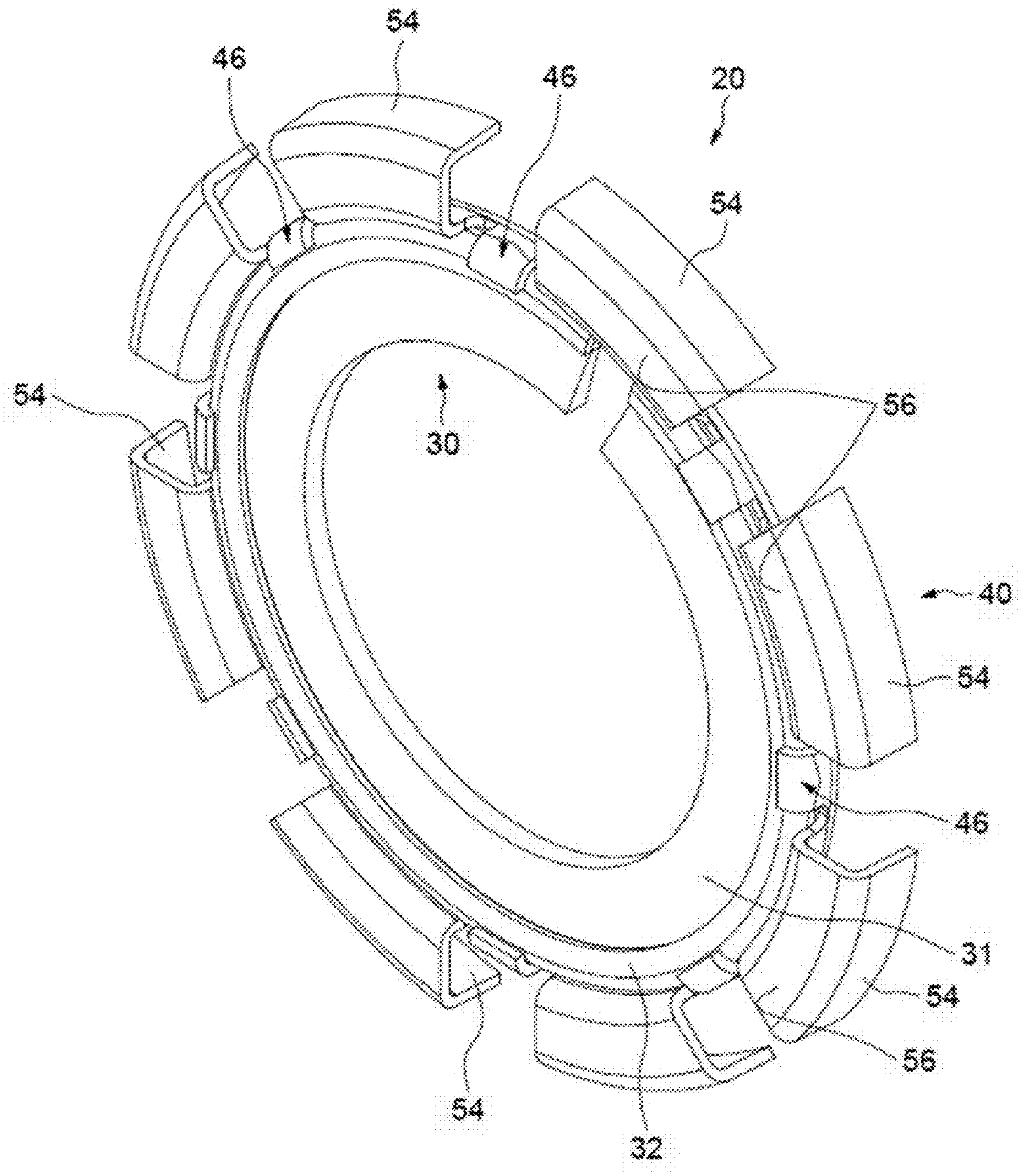
FIG. 9 is a view in front perspective of a grounding brush assembly according to a third embodiment of the invention.
Figure 10:
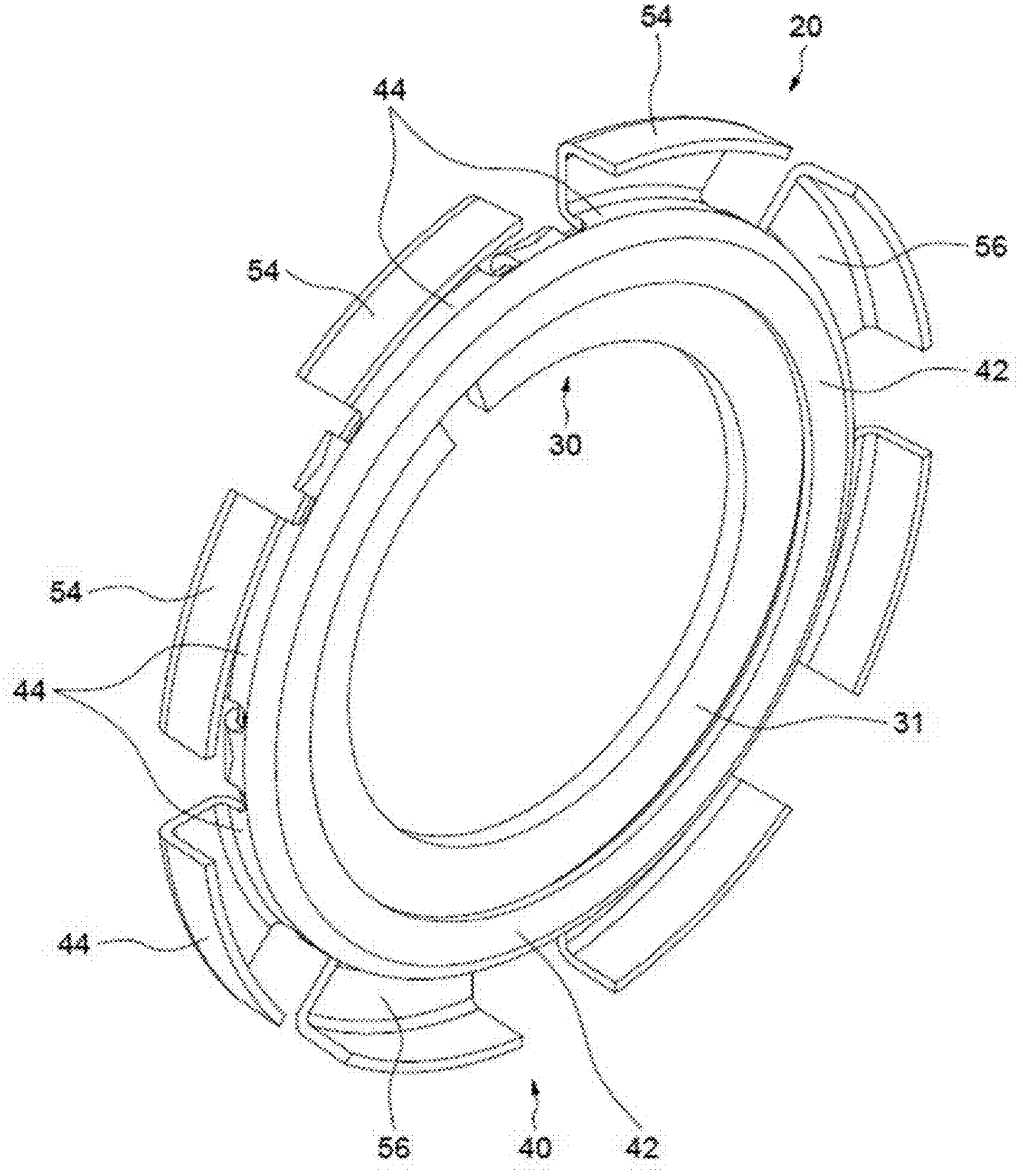
FIG. 10 is a view in rear perspective of a grounding brush assembly according to a third embodiment of the invention.
Figure 11:
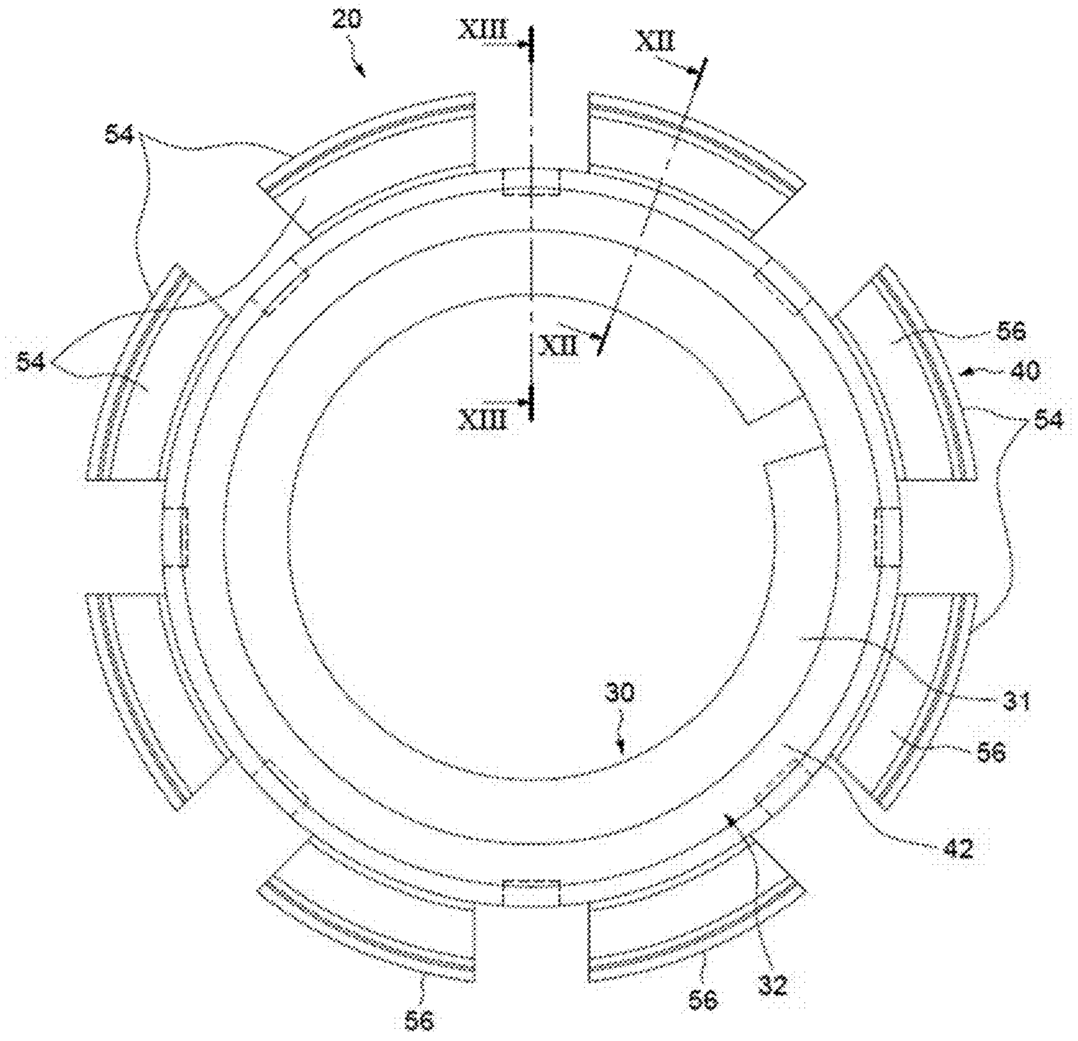
FIG. 11 is a front view of the grounding brush assembly of FIGS. 9 and 10.
Figure 12:
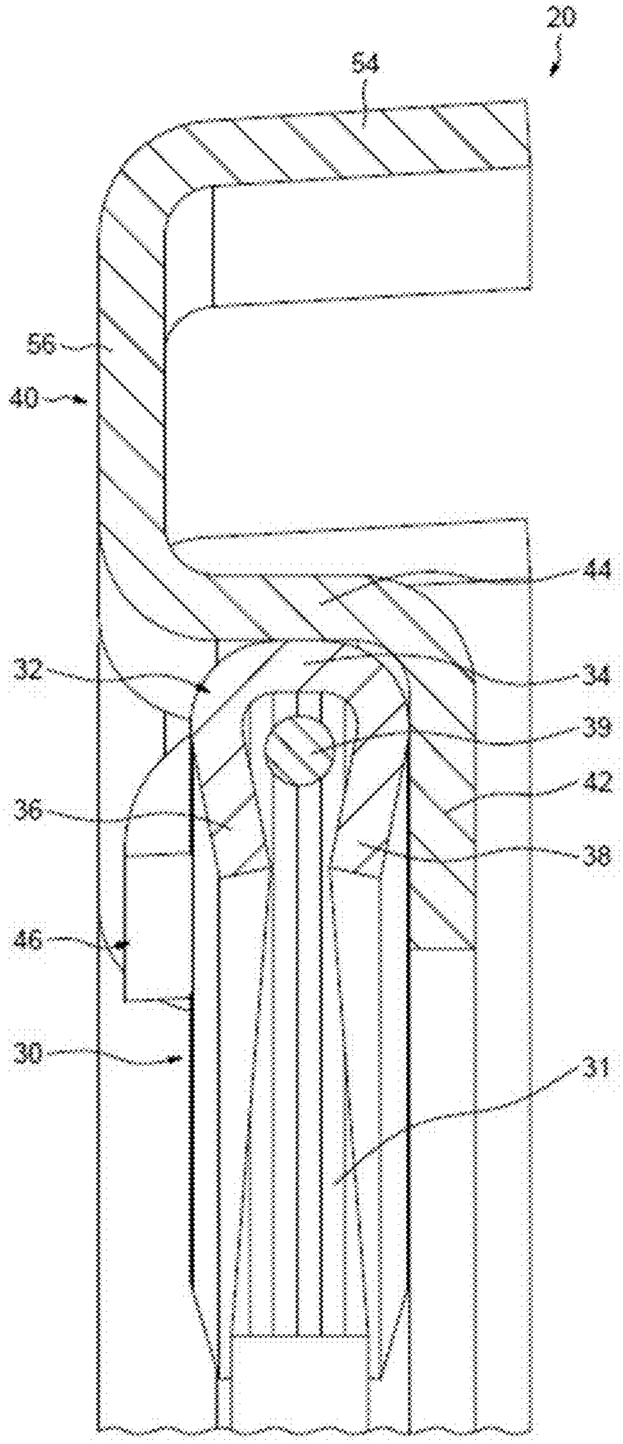
FIG. 12 is a view in cross-section along the axis XII-XII of FIG. 11.
Figure 13:
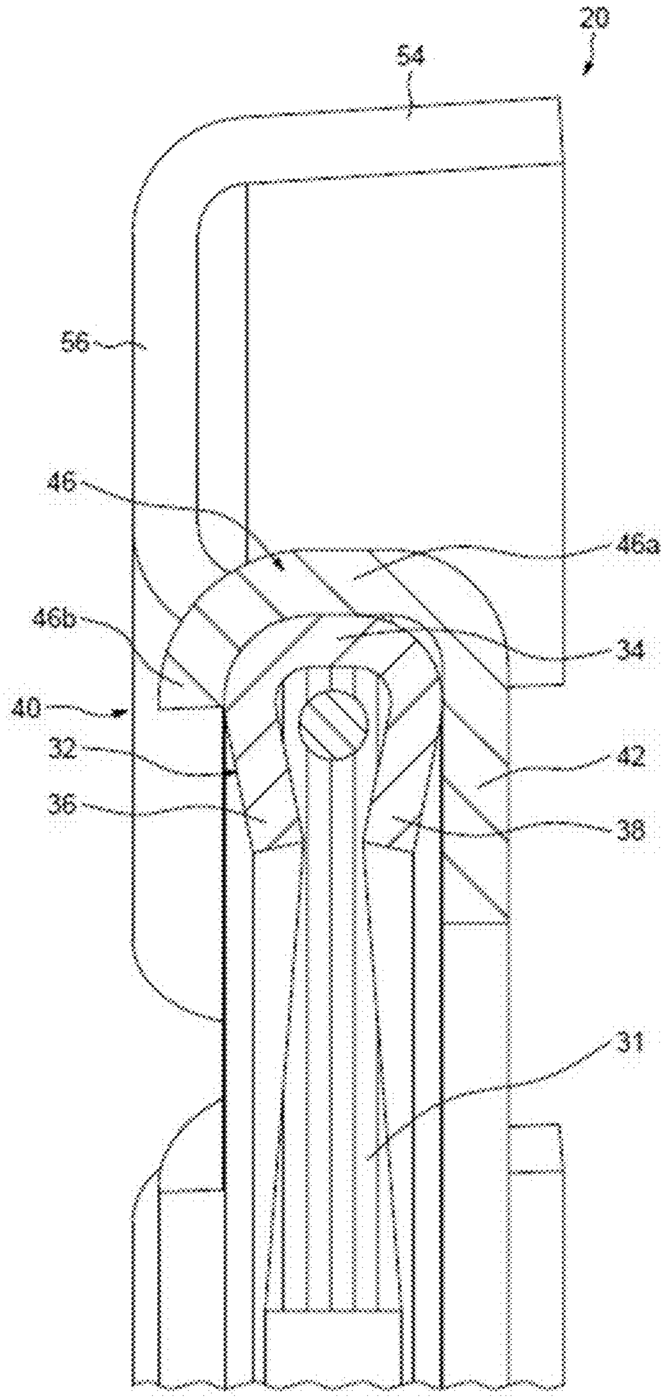
FIG. 13 is a view in cross-section along the axis XIII-XIII of FIG. 11.

The embodiment depicted in FIG. 8, in which identical elements bear the same reference numbers, differs from the first embodiment in that the flange 50 of the fitting plate 40 is supported radially against the axial portions 44 and the tongues 46 by forming a fold so as to locally provide a double thickness of material. In this embodiment, the fitting plate 40 is without the radial connection portion connecting the axial portions 44 to the flange 50. Also in this embodiment, the openings 52 are provided in the flange 50.

The embodiment illustrated in FIGS. 9-13, in which identical elements bear the same references, primarily differs from the first example in that the flange of the fitting plate 40 is replaced by a plurality of lugs 54, which also provide the function of fitting and centering of the fitting plate 40. Specifically, the lugs 54 form a portion for fitting and centering of the fitting plate 40 during the process of fitting brush assembly 20 within the bore 12*a* of the housing 12 of the associated electric motor 10.

In this example, the fitting plate 40 includes a plurality of radial portions 56 which each extend radially outwardly from the axial portions 44. Each lug 54 extends axially from a separate one of the plurality of radial portions 56. Thus, each radial portion 56 provides a portion for connection of the associated axial portion 44 with the associated lug 54.

Each radial portion 56 extends radially outwardly from the associated axial portion 44 on the axial side or end opposite to the radial portion 42. Thus, each radial portion 56 is offset axially relative to the radial portion 42. The radial portions 56 and the radial portion 42 are situated or located axially on both sides of the support 32. The radial portions 56 are offset axially relative to the lateral flank 36 of the support 32 on the side opposite to the radial portion 42.

Each lug 54 extends axially from the associated radial portion 56 and locally radially surrounds and is radially spaced from the associated axial portion 44. The lugs 54 collectively define the outer diameter of the fitting plate 40. The lugs 54 are also offset radially outwardly relative to the tongues 46. The lugs 54 and the tongues 46 extend axially in two opposite or opposing directions.

Each lug 54 extends axially from a large diameter edge of the associated radial portion 56. Preferably, each lug 54 is in the form of a portion of a cylinder. The bore of each lug 54 is spaced radially from the axial portions 44 by a non-zero radial distance. The outer surfaces of the lugs 54 collectively define an outer circumferential surface of the fitting plate 40.

The lugs 54 are spaced circumferentially spaced apart from each other, preferably regularly or evenly. Alternatively, it could be possible to provide irregular circumferential spacing or "staggering" of the lugs 54.

Each lug 54 is disposed or situated circumferentially between two immediately successive tongues 46 and is spaced circumferentially apart from each one of the two immediately adjacent tongues 46. In other words, a circumferential space is provided between each lug 54 and each immediately adjacent tongue 46, such that there is no portion connecting a lug 54 to an adjacent tongue 46 in the circumferential direction.

In the depicted embodiment, each lug 54 has a circumferential dimension which is larger or greater than a circumferential dimension of each tongue 46. For example, the circumferential dimension of the lugs 54 can be between 10° and 45°. In the illustrated embodiment, the number of lugs 54 is equal to the number of tongues 46. Alternatively, it is possible to provide a number of lugs 54 different from the number of tongues 46.

In this embodiment, the lugs 54 extend obliquely towards the exterior, i.e. both axially and radially. Alternatively, the lugs 54 could extend purely or entirely axially.

Figure 14:
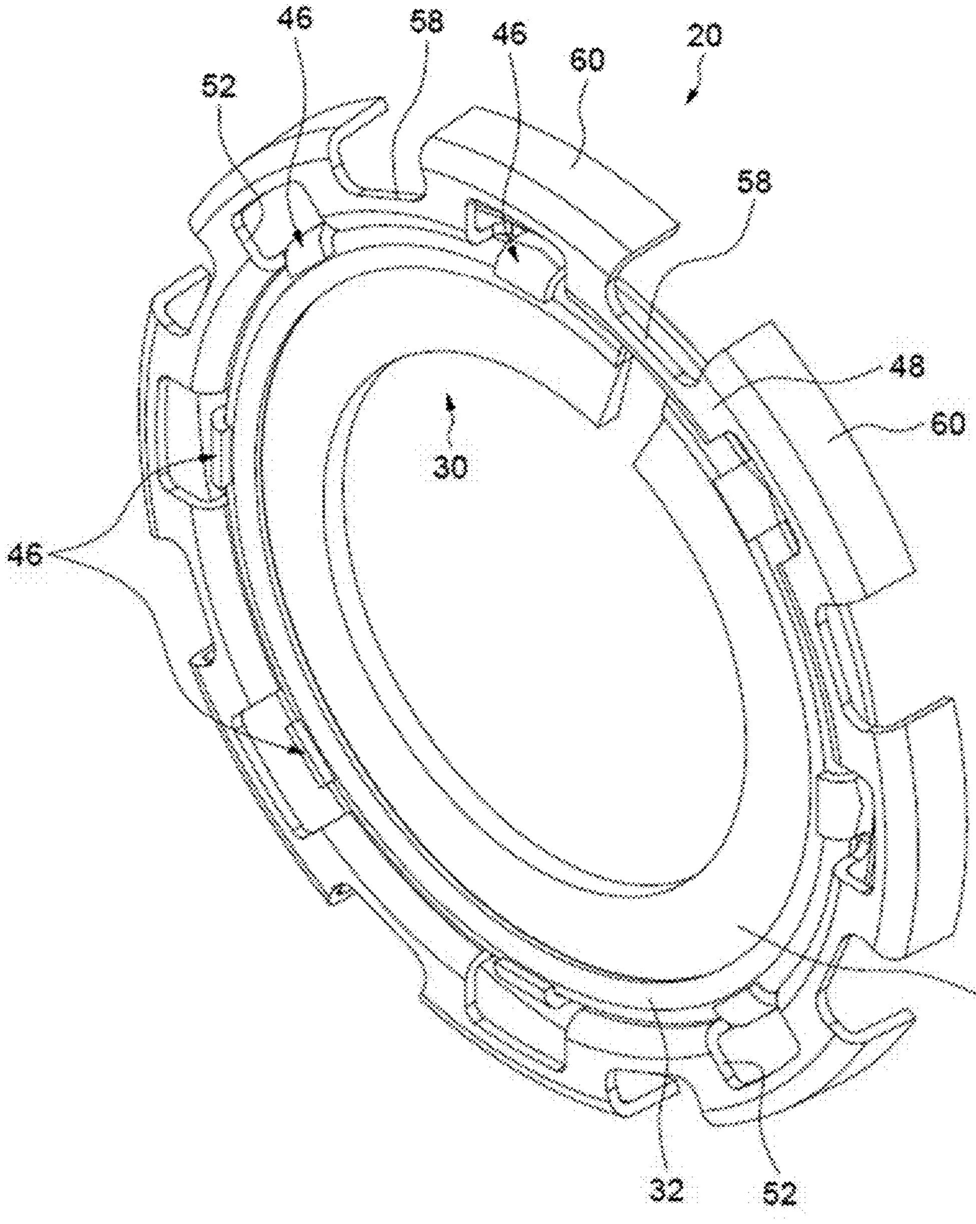
FIG. 14 is a view in front perspective of a grounding brush assembly according to a fourth embodiment of the invention.
Figure 15:
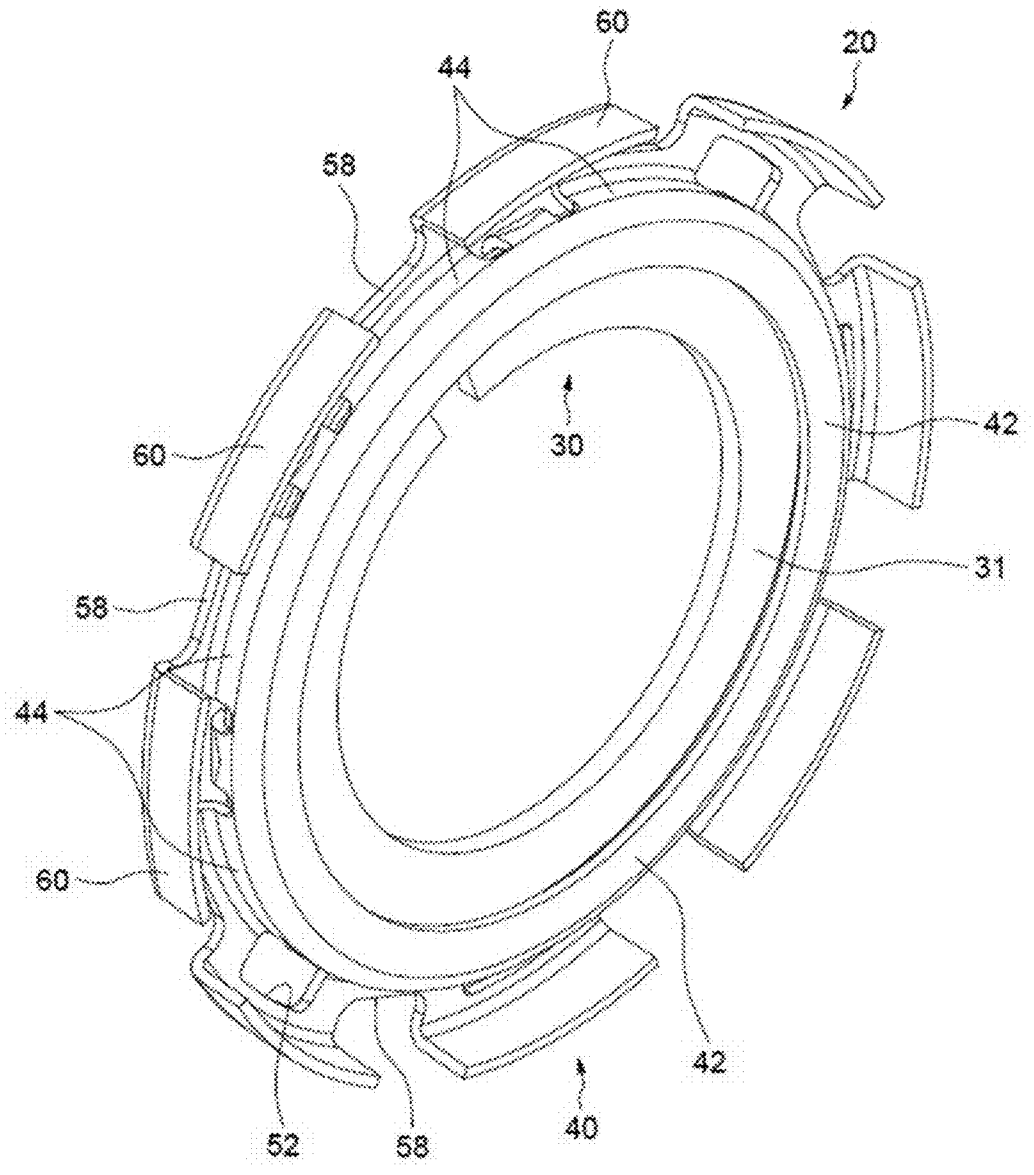
FIG. 15 is a view in rear perspective of a grounding brush assembly according to a fourth embodiment of the invention.

The embodiment illustrated in FIGS. 14 and 15, in which identical elements bear the same references, differs from the first embodiment in that a plurality of cut-outs 58 are formed on the radial portion 48 of the fitting plate 40. Each cut-out 58 is situated or located circumferentially between two immediately successive tongues 46. Each cut-out 58 also extends around the outer periphery of the fitting plate 40, so as to form a plurality of lugs 60 replacing the annular flange. The lugs 60 of the fitting plate are identical to the lugs of the third embodiment as depicted and described above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers within the support; and a brush fitting plate connected with the support of the brush, the fitting plate including a radial portion supported axially against the support of the brush, a plurality of retention tongues configured to axially retain the support and a plurality of axial centering portions extending from the radial portion and being configured to radially center the support of the brush, the plurality of axial centering portions being spaced circumferentially apart and supported radially against the support of the brush, each retention tongue being disposed circumferentially between two successive axial centering portions;

wherein the brush fitting plate further includes a fitting portion for fitting and centering the fitting plate within a bore of a housing, the fitting portion being offset radially outwardly relative to the axial centering portions and to the retention tongues so as to radially overlap at least the axial centering portions, the fitting portion having an exterior surface defining the outer diameter of the fitting plate.

2. The assembly according to claim 1, wherein the support of the brush includes a fitting portion and two lateral flanks extending from the fitting portion and axially enclosing the conductive fibers, the radial portion of the fitting plate being supported axially against one of the lateral flanks of the support, and the axial centering portions being supported radially against the fitting portion of the support.

3. The assembly according to claim 1, wherein each retention tongue of the fitting plate includes an axial portion supported radially against a fitting portion of the support of the brush and a radial portion extending radially inwardly from the axial portion and disposed axially in contact against the support.

4. The assembly according to claim 1, wherein the fitting portion of the fitting plate includes an annular flange.

5. The assembly according to claim 1, wherein the fitting portion of the fitting plate includes a plurality of circumferentially spaced fitting lugs.

6. The assembly according to claim 1, wherein the fitting plate further includes at least one connection portion extending from at least one of the axial centering portions and connected to the fitting portion.

7. The assembly according to claim 6, wherein the connection portion and the radial portion of the fitting plate are each located on a separate axial side of the support of the brush.

* * * * *